US008209683B2

(12) United States Patent
Austen et al.

(10) Patent No.: US 8,209,683 B2
(45) Date of Patent: Jun. 26, 2012

(54) SYSTEM AND METHOD FOR PROBING HYPERVISOR TASKS IN AN ASYNCHRONOUS ENVIRONMENT

(75) Inventors: Christopher H. Austen, Pflugerville, TX (US); David A. Larson, Rochester, MN (US); James A. Lindeman, Austin, TX (US); Gary L. Ruzek, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1425 days.

(21) Appl. No.: 11/736,027

(22) Filed: Apr. 17, 2007

(65) Prior Publication Data

US 2008/0263288 A1   Oct. 23, 2008

(51) Int. Cl.
*G06F 9/455*   (2006.01)
*G06F 11/00*   (2006.01)
(52) U.S. Cl. .................................. 718/1; 714/1; 714/2
(58) Field of Classification Search .................. 718/1
See application file for complete search history.

(56) References Cited

U.S. PATENT DOCUMENTS

| 5,220,674 | A  | * | 6/1993 | Morgan et al. ............... 709/223 |
| 6,880,021 | B2 | * | 4/2005 | Easton et al. .................... 710/5 |
| 7,376,948 | B2 | * | 5/2008 | Armstrong et al. ............ 718/1 |
| 7,636,800 | B2 | * | 12/2009 | Ben-Yehuda et al. .......... 710/28 |
| 2004/0194096 | A1 |  | 9/2004 | Armstrong et al. |
| 2004/0215905 | A1 | * | 10/2004 | Armstrong et al. .......... 711/156 |
| 2006/0149995 | A1 |  | 7/2006 | Kondajeri et al. |

FOREIGN PATENT DOCUMENTS

CN   1811719 A   8/2006

* cited by examiner

*Primary Examiner* — Jennifer To
(74) *Attorney, Agent, or Firm* — Yudell Isidore Ng Russell PLLC

(57) ABSTRACT

A system, method, and computer-usable medium for probing hypervisor tasks in an asynchronous environment. According to an embodiment of the invention, the partition firmware sends a request for data to the hypervisor. When the hypervisor receives the request for data, the hypervisor returns a taskID that identifies the task allocated to handle the request. Partition firmware records the taskID and a timestamp, which indicates the time in which the hypervisor received the request. A timer is set to measure the amount of time elapsed since the task ID was received by a requesting partition firmware. If the hypervisor has not provided the partition firmware with the requested data after a predetermined time period measured by the timer has elapsed, the partition firmware inquires about the status of the task associated with the taskID. If the task is still running, the partition firmware returns control of the partition to the operating system.

6 Claims, 3 Drawing Sheets

SYSTEM AND METHOD FOR PROBING HYPERVISOR TASKS IN AN ASYNCHRONOUS ENVIRONMENT

BACKGROUND OF THE INVENTION

1. Technical Field

The present invention relates in general to the field of data processing systems, and in particular to an improved system and method for managing processes in a data processing system.

2. Description of the Related Art

Logical partitioned (LPAR) functionality within a data processing system allows multiple copies of a single operating system (OS) or multiple heterogeneous operating systems to be simultaneously run on a single data processing system platform. A partition, within which an operating system image runs, is assigned a non-overlapping subset of the platform's resources. These resources include one or more architecturally distinct processors with their interrupt management area, regions of system memory, and input/output (I/O) adapter bus slots. The partition's resources are represented by the platform's firmware to the operating system image.

Each distinct operating system or operating system image running within the platform is protected from each other distinct operating system or operating system image such that software errors in one logical partition cannot affect the correct operation of any of the other partitions. The protection is provided by allocating a disjoint set of platform resources to be directly managed by each operating system image and by providing mechanisms for ensuring that a given operating system image cannot control any resources that have not been allocated to that given operating system image. Furthermore, software errors in the control of an operating system's allocated resources are prevented from affecting the resources of any other image. Thus, each operating system image (or each different operating system) directly controls a distinct set of allocable resources within the platform.

With respect to hardware resources in a LPAR data processing system, these resources are disjointly shared among various partitions, themselves disjoint, each one appearing to be a stand-alone computer. These resources may include, for example, input/output (I/O) adapters, dual-inline memory modules (DIMMs), non-volatile random access memory (NVRAM), and hard disk drives. Each partition within the LPAR data processing system may be booted and shutdown without having to power-cycle the whole system.

In a LPAR data processing system, the different partitions include partition firmware, which is used in conjunction with the operating systems in the partitions. As well-known in the art, LPAR data processing systems also enable the partition firmware to run threads simultaneously. The partition firmware can perform tasks that often require extended execution times without causing interrupt and OS timer problems. When a task is requested by the OS, the firmware first runs a small layer of partition firmware code. The partition firmware code issues a call/event to a hypervisor to perform the requested task. The hypervisor, which is also known as a "virtual machine monitor", enables multiple operating systems to run simultaneously on a data processing system by acting as an arbitrator between the multiple partitions. After the event has been requested, the partition firmware code returns to the OS with a status of "BUSY". The OS recognizes the firmware has not finished collecting the requested data because of the "BUSY" status and the OS queries the firmware again.

The constant querying of the partition firmware is continued until the hypervisor has completed the asynchronous event (also referred to herein as a "hypervisor task"). Once complete, the hypervisor places the requested data into the partition firmware's memory region and returns control to the partition firmware code for further data refinement.

Those with skill in the art will appreciate that often, the hypervisor task that was supposed to be collecting data for the OS fails in such a way that the hypervisor task is not capable of responding to the partition firmware queries. The partition firmware code constantly returns a "BUSY" status to the OS while the OS constantly queries the partition firmware. The constant queries result both in degraded performance of the overall system and a hung process if the hypervisor task responsible for servicing the request for data has stopped operating.

As is well-known in the art, one solution to the constant query problem is to implement a timer that expires after a predetermined period of time. Once the timer expires, the OS can fail any request that has not been fulfilled. However, utilizing a timer introduces a difficulty in determining a correct period in which to set the timer. If the period is set at a short time period, the OS can fail hypervisor tasks that are still working to retrieve data, but have not completed retrieving the data. If the timer period is set at a longer time period, the OS can prevent new requests from initiating. Therefore, there is a need for a system and method for probing hypervisor tasks in an asynchronous environment in a data processing system.

SUMMARY OF THE INVENTION

The present invention includes a system, method, and computer-usable medium for probing hypervisor tasks in an asynchronous environment. According to an embodiment of the invention, a data processing system is implemented as a logical partitioned (LPAR) data processing system. The LPAR data processing system includes multiple heterogeneous operating systems or multiple instances of the same operating system running simultaneously in multiple partitions. The multiple partitions also include corresponding partition firmware that provides functions that may be called by the operating systems. Also included in the data processing system is a hypervisor for servicing requests from the partition firmware.

The partition firmware sends a request for data to the hypervisor. When the hypervisor receives the request for data, the hypervisor returns a taskID that identifies the task allocated to handle the request and a timestamp, which indicates the time in which the hypervisor received the request. A timer is set to measure the amount of time elapsed since the task ID was received by a requesting partition firmware. If the hypervisor has not provided the partition firmware with the requested data after a predetermined time period measured by the timer has elapsed, the partition firmware inquires about the status of the task associated with the taskID. If the task is still running, the partition firmware returns control of the partition to the operating system and the partition firmware resets the timer. If the task is not running, the task is discarded and the hypervisor performs error handling to discard the task.

The above, as well as additional purposes, features, and advantages of the present invention will become apparent in the following detailed written description.

BRIEF DESCRIPTION OF THE FIGURES

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying figures, wherein:

DETAILED DESCRIPTION OF AN ILLUSTRATIVE EMBODIMENT

The present invention includes a system and method for probing tasks in an asynchronous environment. According to an embodiment of the invention, a data processing system is implemented as a logical partitioned (LPAR) data processing system. The LPAR data processing system includes multiple heterogeneous operating systems or multiple instances of the same operating system (OS) running simultaneously in multiple partitions. The multiple partitions also include a corresponding partition firmware that provides functions that may be called by the operating systems. Also included in the data processing system is a hypervisor for servicing requests from each of the partition firmware.

The OS desires information from firmware. The OS issues a request to the corresponding partition firmware. The partition firmware sends the request for data to the hypervisor. When the hypervisor receives the request for data, the hypervisor returns a taskID that identifies the task allocated to handle the request. Partition firmware records the taskID and a timestamp, which indicates the time in which the hypervisor received the request. A timer is set to measure the amount of time elapsed since the hypervisor received the request. The partition firmware returns control to the OS and indicates "BUSY". The OS will repeat the request to partition firmware. If the hypervisor has not provided the partition firmware with the requested data after a predetermined time period measured by the timer has elapsed, the partition firmware inquires about the status of the task associated with the taskID. If the task is still running, the partition firmware returns control of the partition to the operating system and indicates "BUSY". If the task is not running, the task is discarded and the partition firmware performs error handling to discard the task.

Figure 1:
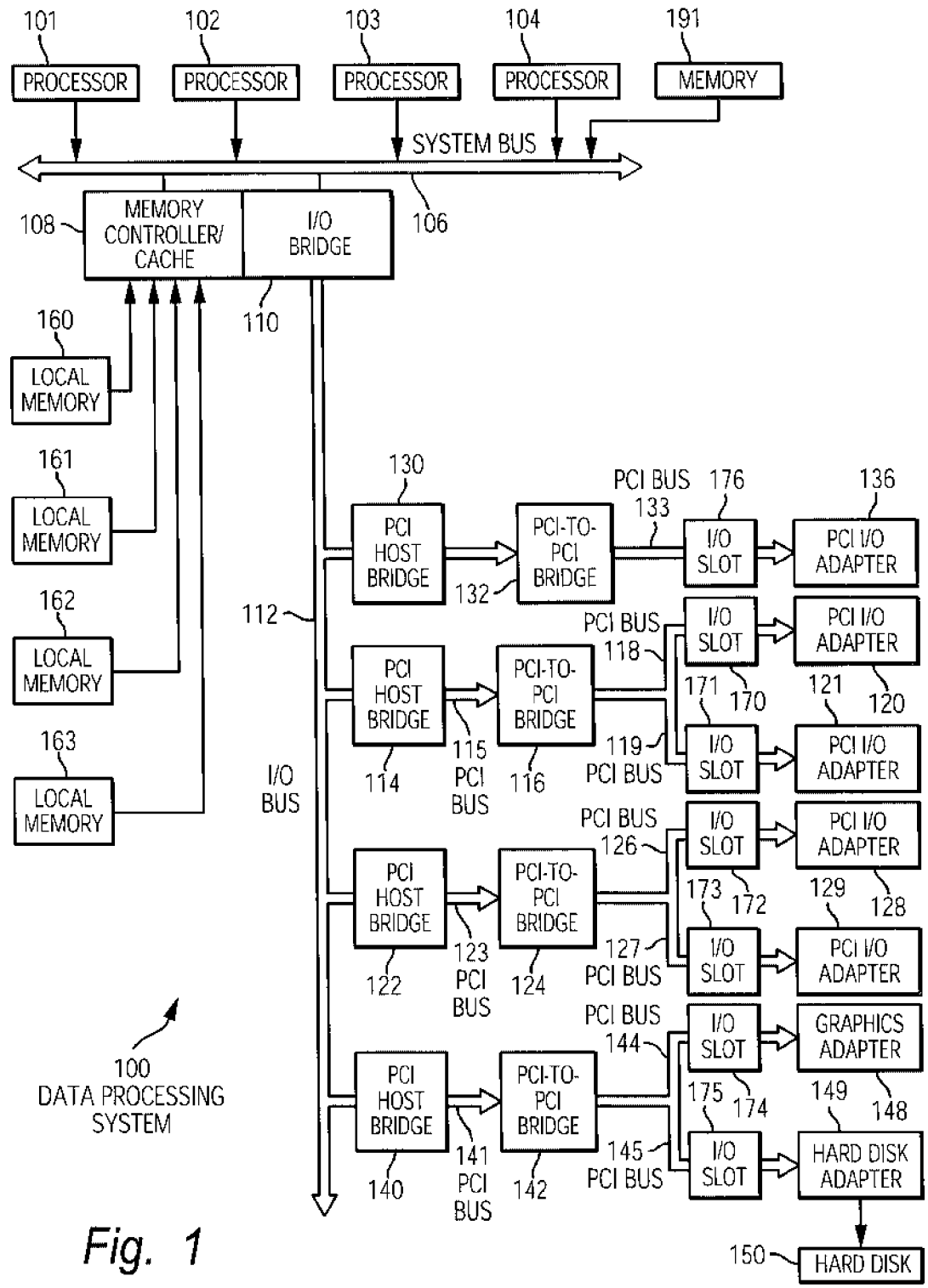
FIG. 1 is a block diagram illustrating an exemplary data processing system in which a preferred embodiment of the present invention may be implemented.

With reference now to the figures, and in particular with reference to FIG. 1, a block diagram of a data processing system in which an embodiment of the present invention may be implemented is depicted. Data processing system 100 may be a symmetric multiprocessor (SMP) system including a collection of processors 101, 102, 103, and 104 connected to a system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a collection of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, 136, graphics adapter 148, hard disk adapter 149, each of host processors 101-104, and each of local memories 160-163 is assigned to one of the three partitions. For example, processor 101, local memory 160, and I/O adapters 120, 128, and 129 may be assigned to a first logical partition; processors 102-103, local memory 161, and PCI I/O adapters 121 and 136 may be assigned to a second logical partition; and processor 104, local memories 162-163, graphics adapter 148, and hard disk adapter 149 may be assigned to a third logical partition.

Each operating system executing within data processing system 100 is assigned to a different logical partition. Thus, each operating system executing within data processing system 100 may access only those I/O units that are within its logical partition. For example, one instance of the Advanced Interactive Executive (AIX) operating system may be executing within partition P1, a second instance (image) of the AIX operating system may be executing with partition P2, and a Windows XP® operating system may be operating within logical partition P3. Windows XP® is a product and trademark of Microsoft Corporation of Redmond, Wash. Those with skill in the art will appreciate that the present invention does not limit the number of partitions in data processing system 100 to three, but may include any number of partitions.

Peripheral component interconnect (PCI) host bridges 130, 114, 122, and 140 are coupled to I/O slots 170-176 to I/O bus 112 via PCI buses 115, 118, 119, 123, 126, 127, 131, 133, 141, 144, and 145. The I/O slots 170-176 provide interfaces for PCI I/O adapters 120, 121, 128, 129, 136, graphics adapter 148, and hard disk adapter 149. Hard disk adapter 149 couples hard disk 150 to I/O bus 110.

Data processing system 100 may be implemented using various commercially available computer systems. For example, data processing system 100 may be implemented using IBM eServer iSeries Model 840 system available from International Business Machines Corporation. Such a system may support logical partitioning while executing an AIX or Linux operating system.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
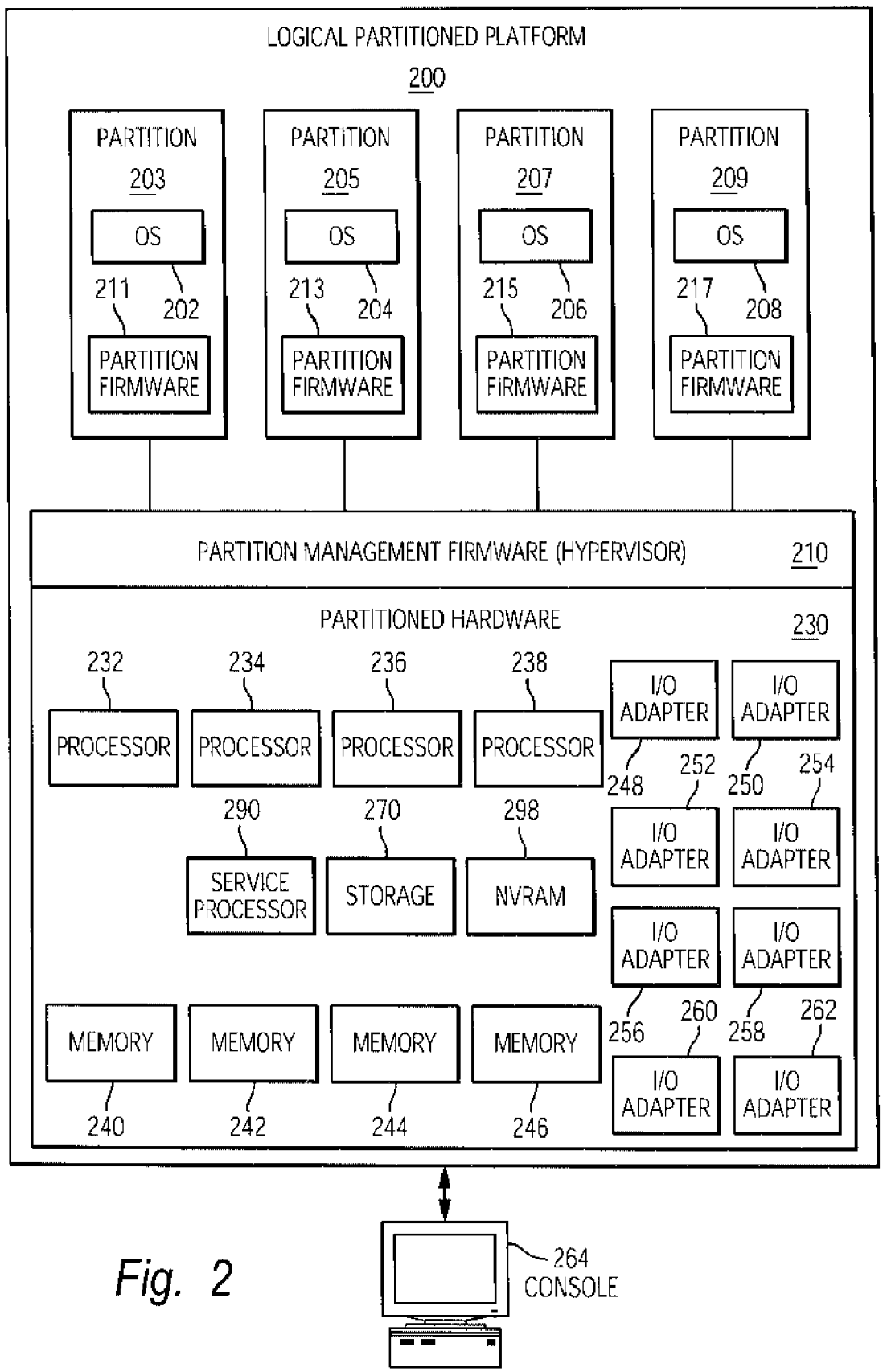
FIG. 2 is a block diagram of an exemplary logical system in which a preferred embodiment of the present invention may be implemented.

With reference now to FIG. 2, a block diagram of an exemplary logical partitioned platform is depicted in which the present invention may be implemented. The hardware in logical partitioned platform 200 may be implemented with, for example, data processing system 100 in FIG. 1. Logical partitioned platform 200 includes partitioned hardware 230, operating systems (OS) 202, 204, 206, 208, and partition management firmware, also referred to herein as hypervisor 210. OS 202, 204, 206, and 208 may be multiple copies of a single operating system or multiple heterogeneous operating systems simultaneously running on platform 200. These OSes may be implemented utilizing AIX or Linux, which are designed to interface with a hypervisor. OSes 202, 204, 206, and 208 are located in partitions 203, 205, 207, and 209, respectively.

Additionally, these partitions 203, 205, 207, and 209 also include partition firmware (PFW) 211, 213, 215, and 217, respectively. Partition firmware 211, 213, 215, and/or 217 provides functions that may be called by the operation system in the partition. When partitions 203, 205, 207, and 209 are instantiated, a copy of the partition firmware is loaded into each partition by the hypervisor's partition manager. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Partitioned hardware 230 also includes service processor 290, which may be used to provide various services, such as processing of errors in the partitions. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware (hypervisor) 210 performs a number of functions and services for partitions 203, 205, 207, and 209 to create and enforce the partitioning of logical partitioned platform 200. Hypervisor 210 is a firmware implemented virtual machine identical to the underlying hardware. Hypervisor software is available from International Business Machines Corporation. Firmware is "software" stored in a memory chip that holds content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). Thus, hypervisor 210 allows the simultaneous execution of independent OS images 202, 204, 206, and 208 by virtualizing all the hardware resources of logical partitioned platform 200.

Operations of the different partitions may be controlled through a hardware management console, such as console 264. Console 264 is a separate data processing system from which a system administrator may perform various functions including reallocation of resources to different partitions.

Figure 3:
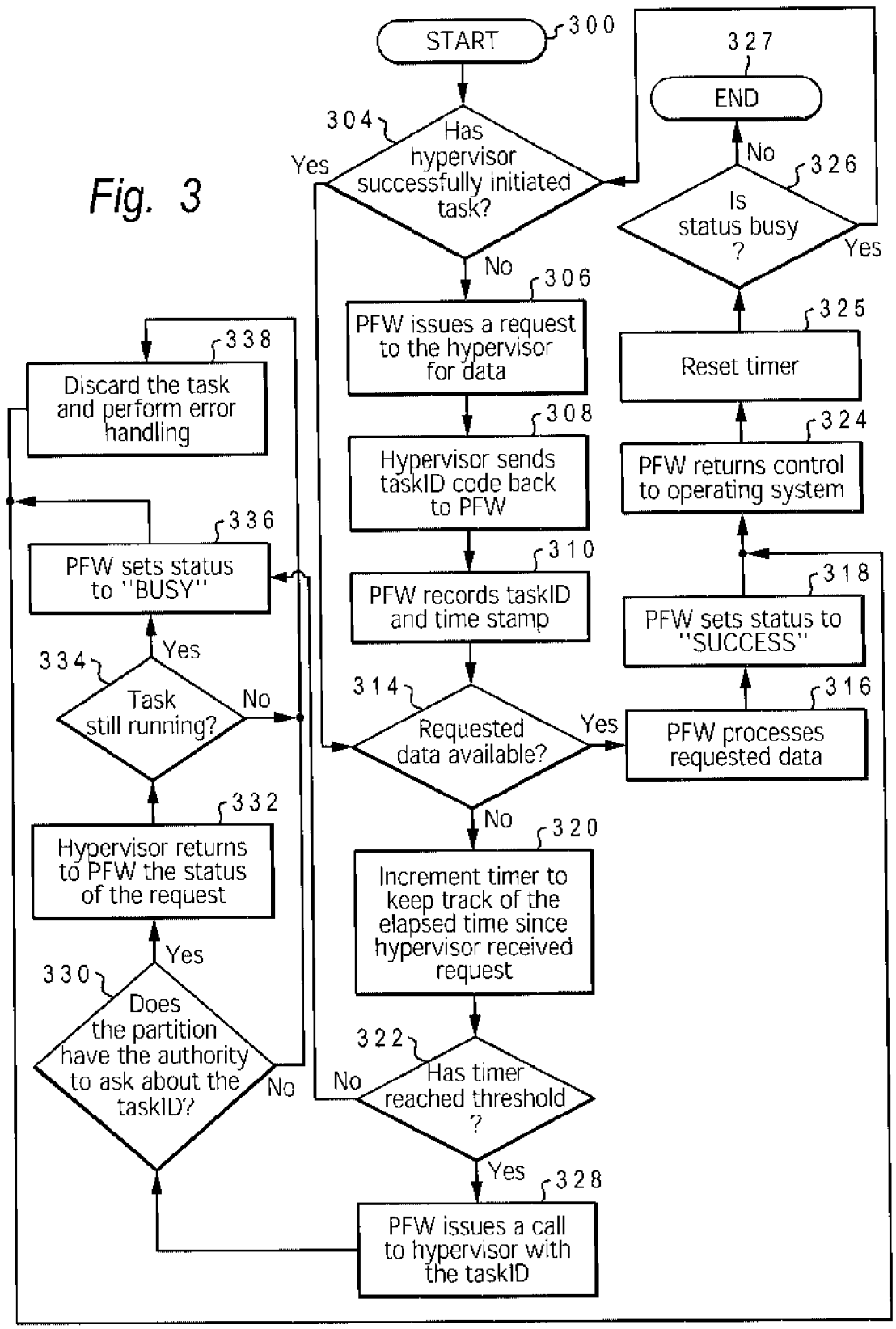
FIG. 3 is a high-level logical flowchart depicting an exemplary method for probing hypervisor tasks in an asynchronous environment according to an embodiment of the present invention.

FIG. 3 is a high-level logical flowchart depicting an exemplary method for probing tasks in an asynchronous environment in a data processing system according to a preferred embodiment of the present invention. The process begins at step 300 and continues to step 304, which illustrates a particular partition firmware (e.g., partition firmware 211, 213, 215, and 217 of FIG. 2) determining if hypervisor 210 has successfully initiated a requested task. If so, the process continues to step 314, as discussed herein in more detail.

If hypervisor 210 has not successfully initiated a requested task, the process continues to step 306, which depicts the partition firmware issuing a request to hypervisor 210 for data. The process proceeds to step 308, which shows hypervisor 210 sending a taskID code back to the partition firmware. The taskID code identifies a task assigned to service the request for data. The process proceeds to step 310, which illustrates the partition firmware recording the taskID code and the time stamp of when the taskID code was received.

Step 314 illustrates partition firmware determining if the requested data is available from hypervisor 210. If the requested data is available, the partition firmware processes the requested data, as illustrated in step 316. The partition firmware then sets its own status to "SUCCESS" (step 318) and returns control of the partition to the operating system (e.g., operating systems 202, 204, 206, and 208), as depicted in step 324. The process proceeds to step 325, which shows the partition firmware resetting the timer for another query to hypervisor 210 from the partition firmware. The process continues to step 326, which illustrates the partition firmware determining if its own status is set to "BUSY." If the status is not set to "BUSY", the process ends, as illustrated in step 326. If the status is set to "BUSY" the process returns to step 304 and proceeds in an iterative fashion.

Returning to step 314, if the requested data is not available from hypervisor 210, the process continues to step 320, which illustrates the partition firmware incrementing a timer to keep track of the elapsed time since the taskID was received at the partition firmware from hypervisor 210. The process continues to step 322, which shows the partition firmware determining if the timer has reached a predetermined timer threshold. As well-known to those with skill in the art, the predetermined threshold can be set to any appropriate value. For example, in an embodiment of the present invention, the predetermined timer threshold is set to 500 microseconds, since the OS may query the partition firmware for data fulfilling the original request within that time.

If the timer threshold has not been reached at step 322, the process proceeds to step 336, which illustrates the partition firmware setting the status of the task to "BUSY". The process then proceeds to step 324, which depicts the partition firmware returning the control of the partition to the associated operating system.

If the timer threshold has been reached at step 322, the process continues to step 328, which depicts the partition firmware issuing a call to hypervisor 210 with the taskID of the request. The process proceeds to step 330, which illustrates hypervisor 210 determining if the particular partition actually has the authority to ask about the task with the particular taskID. If not, the process proceeds to step 338.

If the particular partition has the authority to ask about the task with the particular taskID at step 330, the process continues to step 332, which depicts hypervisor 210 returning the status of the request to the partition firmware. If the task is still running at step 334, as determined at step 334, the partition firmware will set the status of the task to "BUSY", as illustrated in steps 334 and 336. The process then continues to step 324. If the task is not still running at step 334, the process continues to step 338, which shows hypervisor 210 discarding the task and performing error handling. The process then continues to step 324.

Step 324 illustrates the partition firmware returning control of the partition to the operation system associated with the partition firmware. For example, if partition firmware 217 is sending requests for data to hypervisor 210, partition firmware 217 would return control of the partition to operating system 208. From step 324, the process proceeds to step 325, which shows the partition firmware resetting the timer for another query to hypervisor 210 from the partition firmware. The process continues to step 326, which depicts the partition firmware checking to see if the status of the data request is still "BUSY". If so, the process returns to step 300. If the status of the data request is not "BUSY" at step 326, the process ends at step 327. Basically, if the status of the data request is not "BUSY" the partition firmware assumes that the request has already been fulfilled or has been discarded, as shown in step 338.

As discussed, the present invention includes a system and method for probing tasks in an asynchronous environment. According to an embodiment of the present invention, a data processing system is implemented as a logical partitioned (LPAR) data processing system. The LPAR data processing system includes multiple heterogeneous operating systems or multiple instances of the same operating system running simultaneously in multiple partitions. The multiple partitions also include a corresponding partition firmware that provides functions that may be called by the operating systems. Also included in the data processing system is a hypervisor for servicing requests from the partition firmware.

The partition firmware sends a request for data to the hypervisor. When the hypervisor receives the request for data, the hypervisor returns a taskID that identifies the task allocated to handle the request. Partition firmware records the taskID and the timestamp, which indicates the time in which the hypervisor received the request. A timer is set by the partition firmware to measure the amount of time elapsed since the task ID was received by a requesting partition firmware. If the hypervisor has not provided the partition firmware with the requested data after a predetermined time period measured by the timer has elapsed, the partition firmware inquires about the status of the task associated with the taskID. If the task is still running, the partition firmware returns control of the partition to the operating system. If the task is not running, the task is discarded and the hypervisor performs error handling to discard the task.

It should be understood that at least some aspects of the present invention may alternatively be implemented in a computer-usable medium that contains a program product. Programs defining functions in the present invention can be delivered to a data storage system or a computer system via a variety of signal-bearing media, which include, without limitation, non-writable storage media (e.g., CD-ROM), writable storage media (e.g., hard disk drive, read/write CD-ROM, optical media), system memory such as, but not limited to Random Access Memory (RAM), and communication media, such as computer and telephone networks, including Ethernet, the Internet, wireless networks, and like network systems. It should be understood, therefore, that such signal-bearing media, when carrying or encoding computer-readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention.

What is claimed is:

1. A computer-implementable method comprising:
   sending a data request from a partition to a hypervisor stored in a non-volatile memory device, wherein said partition is one of a plurality of logical partitions within a data processing system, wherein said hypervisor initiates a task to handle said data request;
   in response to a predetermined period of time has elapsed since the receipt of a time stamp from said hypervisor, determining whether or not said data request has been fulfilled;
   in a determination that said data request has not been fulfilled, querying said hypervisor to determine a status of said data request;
   if said task assigned to handle said data request is still running, returning control to an operating system executing within said partition to allow said hypervisor to re-initiate said task; and
   if said task assigned to handle said data request is not running, discarding said task and performing error handling by said hypervisor.

2. The method of claim 1, further comprising: if said task assigned to handle said data request is still running, marking a status of said task as "BUSY".

3. The method of claim 1, further comprising: in a determination that said data request has been fulfilled, processing data corresponding to said data request and marking a status of said task as "SUCCESS".

4. A computer-usable device embodying computer program product for probing hypervisor tasks, said computer-usable device comprising:
   program code for sending a data request from a partition to a hypervisor stored in a non-volatile memory device, wherein said partition is one of a plurality of logical partitions within a data processing system, wherein said hypervisor initiates a task to handle said data request;
   program code for, in response to a predetermined period of time has elapsed since the receipt of a time stamp from said hypervisor, determining whether or not said data request has been fulfilled;
   program code for, in a determination that said data request has not been fulfilled, querying said hypervisor to determine a status of said data request;
   program code for, if said task assigned to handle said data request is still running, returning control to an operating system executing within said partition to allow said hypervisor to re-initiate said task; and
   program code for, if said task assigned to handle said data request is not running, discarding said task and performing error handling by said hypervisor.

5. The computer-usable device of claim 4, wherein said computer-usable medium further comprises program code for if said task assigned to handle said data request is still running, marking a status of said task as "BUSY".

6. The computer-usable device of claim 4, wherein said computer-usable medium further comprises program code for, in a determination that said data request has been fulfilled, processing data corresponding to said data request; and marking a status of said task as "SUCCESS".

* * * * *